United States Patent [19]

Pedain et al.

[11] Patent Number: 4,829,122

[45] Date of Patent: May 9, 1989

[54] PROCESS FOR THE PREPARATION OF AQUEOUS POLYURETHANE DISPERSIONS AND SOLUTIONS

[75] Inventors: Josef Pedain, Cologne; Klaus Nachtkamp, Bergisch-Gladbach; Klaus Noll, Cologne; Jürgen Grammel, Dormagen, all of Fed. Rep. of Germany

[73] Assignee: Bayer Aktiengesellschaft, Leverkusen, Fed. Rep. of Germany

[21] Appl. No.: 19,902

[22] Filed: Feb. 27, 1987

Related U.S. Application Data

[63] Continuation of Ser. No. 447,575, Dec. 7, 1982, abandoned, which is a continuation of Ser. No. 908,885, May 24, 1978, abandoned.

[30] Foreign Application Priority Data

Jun. 7, 1977 [DE] Fed. Rep. of Germany ....... 2725589

[51] Int. Cl.$^4$ ..................... C08L 75/06; C08L 75/08; C08L 75/12
[52] U.S. Cl. ................. 524/591; 427/385.5; 428/423.1
[58] Field of Search ......................................... 524/591

[56] References Cited

U.S. PATENT DOCUMENTS 3,420,800  1/1969  Haggis .................................. 525/591
3,756,992  9/1973  Dieterich ............................. 525/591
4,108,814  8/1978  Reiff et al. .......................... 525/591

Primary Examiner—Jacob Ziegler
Attorney, Agent, or Firm—Gene Harsh; Joseph C. Gil; Thomas W. Roy

[57] ABSTRACT

The present invention therefore relates to a process for the preparation of aqueous solutions or dispersions of polyurethane-polyureas by the reaction in the aqueous phase of prepolymers which contain chemically built-in hydrophilic groups and/or external emulsifiers which are not bound chemically as well as at least two free isocyanate groups with organic compounds containing at least two primary and/or secondary amino groups, characterized in that the isocyanate prepolymer which has been hydrophilically modified and/or contains an external emulsifier is mixed, in the absence of water, with compounds containing at the most one free primary or secondary amino group and at least one blocked group which releases a free primary or secondary amino group in the presence of water and a total of at least two at least partially blocked primary and/or secondary amino groups, and the mixture is subsequently mixed with water.

The invention also relates to the dispersions or solutions obtained by this process and to their use for coating flexible and rigid substrates.

9 Claims, No Drawings

PROCESS FOR THE PREPARATION OF AQUEOUS POLYURETHANE DISPERSIONS AND SOLUTIONS

This application is a continuation of application Ser. No. 447,575, filed Dec. 7, 1982, now abandoned, which in turn is a continuation of Ser. No. 908,885, filed May 24, 1978, now abandoned.

BACKGROUND OF THE INVENTION

Processes for the preparation of stable aqueous polyurethane polyurea dispersions are already known and described, for example, in German Pat. Nos. 1,184,946 and 1,178,586; German Auslegeschrift No. 1,237,306, German Offenlegungsschriften No. 1,495,745; 1,595,602; 1,770,068 and 2,019,324; D. Dieterich et al, Angew. Chem. 82, 53 (1970) add U.S. Pat. Nos. 3,686,108; 3,756,992. The dispersions which have been described are based on the principle of incorporating hydrophilic centers in a macromolecular chain of a polyurethane-polyurea molecule. These hydrophilic centers or so-called internal emulsifiers in the known dispersions are ionic groups or ether functions. The ionic groups are either incorporated in the prepolymer in the form of special diols or used as modified amines for chain lengthening the prepolymers which each have at least two isocyanate end functions.

High quality polyurethane films suitable, for example, for textile coating have hitherto been obtained from dispersions which are prepared with the use of organic solvents in the polyaddition reactiton.

By carrying out the polyaddition in solution, it is possible to build up a high quality polyurethane in a homogeneous phase before it is dispersed in water. The solid constituent of the dispersed particles is, therefore, also highly homogeneous.

This highly developed process, which includes anionic and cationic and non-ionic emulsifier segments, has the disadvantage that the organic solvent must be distilled off and rectified by a complicated and expensive process. This results in a poor volume/time yield in the manufacturing process. The organic solvent used as reaction medium increases the risk of explosion and fire during the manufacturing process. When attempts are made to produce such products without the aid of organic solvents, one obtains at best relatively coarse dispersions whose film forming ability and mechanical properties are insufficient for many purposes.

Processes for the solvent-free preparation of polyurethane dispersions have also become known, e.g. the so called melt dispersion process as described in German Offenlegungsschrift No. 1,770,068, U.S. Pat. No. 3,756,992 and D. Dieterich and H. Reiff, Angew, makromol. Chem. 76, 85 (1972). In this process, an oligourethane which has been modified with ionic groups and contains acylated amino end groups is converted into the corresponding oligourethane containing methylol end groups attached to acylated amino groups. This oligourethane is then chain-lengthened by a heat treatment which brings about a condensation reaction of the reactive methylol end groups. This chain lengthening may be carried out in the presence of water so that an aqueous dispersion of a polyurethane is directly obtained. This process is particularly suitable for the preparation of cationically modified polyurethanes or of polyurethanes containing anionic carboxylate groups. The required combination of the isocyanate polyaddition reaction with the aforesaid chain lengthening reaction via methylol groups which are attached to acylamino end groups and capable of undergoing polycondensation reactions makes this process more difficult and complicated than the conventional isocyanate polyaddition by the prepolymer process in which isocyanate prepolymers are reacted with conventional chain lengthening agents such as water or diamines. This additional expenditure could be justified in the process according to German Offenlegungsschrift No. 1,770,068 and U.S. Pat. No. 3,756,992 on the grounds that it was thereby possible, for the first time, to produce polyurethane dispersions without the aid of special stirrers and without the aid of either emulsifiers or solvents.

Another process for the solvent-free preparation of polyurethanes in aqueous dispersions has been described in German Offenlegungsschrift No. 2,446,440 and allowed U.S. Patent Application Ser. No. 777,206 filed Mar. 14, 1977, now U.S. Pat. No. 4,108,814. In this process, a prepolymer containing sulphonate groups and isocyanate groups is reacted without the aid of solvents with a compound which contains isocyanate-reactive hydrogen atoms and is at least difunctional in the isocyanate polyaddition reaction.

In this process, the reaction of the isocyanate prepolymer with the isocyanate-reactive compound occurs during the dispersion process, i.e. after the chain lengthening agent has been dissolved in the water of dispersion or is added after the prepolymer has been dispersed in water. The said process makes it possible for high quality polyurethanes containg sulphonate groups to be obtained in the form of aqueous dispersions. It has, however, the disadvantage that it is restricted to polyurethanes which contain sulphonate groups and that only water or water-soluble polyamines can be used as chain lengthening agents.

Another characteristic feature of this process is that chain lengthening, i.e. the building up to a high molecular weight polyurethane urea, takes place in a heterogeneous phase. The chain lengthening agent e.g. diamine in water, is in the liquid phase and it is only after a certain length of time that it reaches the center of the dispersed particles. It is clear that the chain lengthening agent, i.e. the diamine dissolved in water, will first undergo reaction in the ouer regions of the dispersed particle. The concentration of chain lengthening agentn decreases progressively towards the center of the particles. This process therefore gives rise to dispersions in which the solid particles are not homogeneous. The polyurethane ureas obtained, therefore, have less mechanical strength and in some cases, less resistance to hydrolysis than products which have been prepared in homogeneous solution.

In addition, it is almost impossible to prepare highly concentrated dispersions with a solids content of more than about 40% by the above mentioned process because, at higher solids concentrations, the individual dispersed particles are linked together into larger lumps by the chain lengthening agent which is present mainly between the particles. This results in very high viscosities, which render the products unsuitable for further processing, and in some cases even convert the aqueous dispersion into a paste. Another disadvantage is that polyamines which are insoluble or only sparingly soluble in water cannot be used as chain lengthening agents in the described process, but it is precisely with these polyamines, e.g. diaminocyclohexylmethane, that polyurethane ureas with excellentn mechanical properties can be obtained.

It was, therefore, an object of the present invention to provide a solvent-free or low solvent process by which polyurethanes in the aqueous phase could be obtained with improved properties. To achieve this improvement, the high molecular weight solid lwhich is distributed in the liquid aqueous medium, was to be obtained in as homogeneous a phase as possible.

It has now surprisingly been found that exceptionally high quality polyurethanes in aqueous dispersion or solution could be obtained when prepolymers which, in addition to isocyanate end groups, contain a group which renders them hydrophilc and/or external emulsifier, are mixed with an at least partly blocked polyamine chain lengthening agent before they are dispersed in water.

SUMMARY OF THE INVENTION

The present invention therefore relates to a process for the preparation of aqueous solutions or dispersions of polyurethane-polyureas by the reaction in the aqueous phase of prepolymers which contain chemically built-in hydrophilic groups and/or external emulsifiers which are not bound chemically as well as at least two free isocyanate groups with organic compounds containing at least two primary and/or secondary amino groups, characterized in that the isocyanate prepolymer which has been hydrophilically modified and/or contains an external emulsifier is mixed, in the absence of water, with compounds containing at most one free primary or secondary amino group and at least one blocked group which releases a free primary or secondary amino group in the presence of water and a total of at least two at least partially blocked primary and/or secondary amino groups, and the mixture is subsequently mixed with water.

The invention also relates to the dispersions or solutions obtained by this process.

Lastly, the present invention relates to the use of the dispersions or solutions obtainable by this process for coating flexible substrates.

DETAILED DESCRIPTION OF THE INVENTION

Isocyanate prepolymers which have at least two isocyanate end groups are used as starting materials for the process according to the invention. Difunctional isocyanate prepolymers are preferably used. The isocyanate prepolymers used for the process according to the invention preferably have one or more groups which render them hydrophilic and, therefore, soluble or dispersible in water, but it is also possible to use hydrophobic isocyanate prepolymers for the process according to the invention, provided that they are endered soluble or dispersible in water by the addition of external emulsifiers. The hydrophilic character of isocyanate prepolymers which contain built-in hydrophilic groups may, of course, also be enhanced by the addition of external emulsifiers.

From the above description, it will already be clear that the exact chemcial structure of the isocyanate prepolymers used for the process according to the invention is not critical. This means more particularly that any isocyanate prepolymers which have been used in the past for the preparation of aqueous polyurethane dispersions or solutions may also be used for the process according to the invention. They are prepared by processes which are known in the art and which have been described, for example in German Offenlegungsschriften Nos. 1,495,745; 1,495,847; 2,446,440 and 2,340,512; U.S. Pat. No. 3,479,310 and allowed U.S. patent application Ser. No. 777,206, filed Mar. 14, 1972, all incorporated herein by reference, and British Pats. No. 1,158,088 and 1,076,688.

The preferred isocyanate prepolymers for the process according to the invention, which have chemically built-in hydrophilic groups, are prepared by methods similar to those described in the references cited above. Starting materials for the preparation of these isocyanate prepolymers are, therefore, the following:

1. Any organic polyisocyanates, preferably diisocyanates, represented by the formula:

in which Q represents an aliphatic hydrocarbon group with 4 to 12 carbon atoms; a cycloaliphatic hyudrocarbon group with 6 to 15 carbon atoms; and aromatic hydrocarbon group with 6 to 15 carbon atoms or an araliphatic hydrocarbon groupp with 7 to 15 carbon atoms. The following are examples of such preferred diisocyanates: tetramethylene diisocyanate; hexamethylene diisocyanate; dodecamethylene diisocyanate; 1,4-diisocyanato-cyclohexane; 1-isocyanato-3,3,5-trimethyl-isocyanatomethyl-cyclohexane; isophorone diisocyanate; 4,4'-diisocyanato-dicyclohexyl-methane; 4,4'-diisocyanato-dicyclohexyl-propane-(2,2); 1,4-diisocyanatobenzene; 2,4-diisocyanatotoluene; 2,6-diisocyanatotoluene; 4,4'-diisocyanatodiphenylmethane; 4,4'-diisocyanato-diphenylpropane-(2,2); p-xylene-diisocyanate; α,α,α',α'-tetramethylm- or p-xylene-diisocyanate and mixtures of these compounds.

The higher-functional polyisocyanates known in polyurethane chemistry as well as known modified polyisocyanates, e.g. polyisocyanates containing carbodiimide, allophonate, isocyanurate, urethane and/or biuret groups may, of course, also be used in the process according to the invention either as all or part of the isocyanate component.

2. Any organic compounds having at least two isocyanate-reactive groups, in particular a total of two amino groups, thiol groups, carboxyl groups and/or hydroxyl groups and molecular weights within the range of from about 62 to 10,000, preferably from about 1,000 to 6,000. Dihydroxy compounds of this kind are preferably used. A small proportion of compounds which for the purpose of the isocyanate polyaddition reaction have a functionality of three or more may also be used in order to obtain a certain degree of branching, as may also the trifunctional or higher functional polyisocyanates already mentioned above, which may serve the same purpose.

The hydroxyl compounds preferably used are the hydroxypolyesters, hydroxypolyethers, hydroxypolythioethers, hydropolyacetals, hydroxypolycarbonates and/or hydropolyesters amides already known in polyurethane chemistry.

Suitable hydroxyl polyesters, for example, include reaction products of polyhydric, preferably dihydric alcohols to which trihydric alcohols may be added with polybasic, preferably dibasic carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphpatic, cycloaliphaptic, aromatic and/or heterocyclic, and they may be substituted, e.g. by halogen atoms, and/or unsaturated. The following are mentioned as examples:

Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethyl terephthalate, and terephthalic acid-bis-glycol ester. The following are examples of suitable polyhydric alcohols: ethylene glycol, propyleneglycol-(1,2) and -(1,3), butyleneglycol-(1,4) and - (2,3), hexanediol-(1,6), octanediol-(1,8), neopentylglycol-cyclohexane-dimethanol (1,4-bis-hydromethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methyl glycoside, diethylelne glycol, triethylene glycol, tetraethylene glycol, polyethylene glycols, dipropylene glycols, polypropylene glycols, dibutylene glycols and polybutylene glycols. The polyesters may also contain a proportion of carboxyl end groups. Polyesters of lactones, e.g. of $\epsilon$-caprolactone, or hydroxycarboxylic acid esters, e.g. of $\omega$-hydroxycaproic acid, may also be used.

Polyethers with two hydroxyl groups suitable for the process according to this invention are also already known and may be obtained, for example, by the polymerization of epoxides such as ethylene oxide, propylene oxide, butylene oxide, tetrahydrofuran, styrene oxide or epichlorohydrin, either each on its own, e.g. in the presence of boron trifluoride, or by chemcial addition of these epoxides, as mixtures or successively, to starting components with reactive hydrogen atoms, such as alcohols and amines, e.g. water, ethylene glycol, propylene glycol-(1,3) or -(1,2); or 4,4'-dihydroxydiphenyl-propane or aniline.

Polyethers which have been modified with vinyl polymers may also be used, e.g. the compounds obtained by the polymerization of styrene or acrylonitrile in the presence of polyethers as described in U.S. Pats. No. 3,383,351; 3,304,273; 3,523,093 and 3,110,695, all incorporated herein by reference and German Pat. No. 1,152,536. The higher functional polyethers which may be used in limited proportions are obtained in similar manner by the known method of alkoxylation of higher functional starter molecules such as ammonia, ethanolamine, ethylenediamine or sucrose.

Among the hydroxy polythioethers, there should be particularly mentioned the condensation products obtained by reacting thiodiglycol on its own and/or with other glycols, dicarboxylic acids, formaldehyde, aminocarboxylic acids or aminoalcohols. The products obtained are polythio mixed ethers, polythioether esters or polythioether ester amides, depending on the co-components used.

Suitable hydroxy polyacetals include, for example, the compounds which can be prepared from glycols such as diethylene-glycol, triethylene-glycol, 4,4'- dihydroxyethoxydiphenyl-dimethylmethane, hexanediol and formaldehyde. Polyacetals suitable for the purpose of the invention may also be obtained by the polymerization of cyclic acetals.

Suitable polycarbonates with hydroxyl groups are already known and may be prepared, for example, by the reaction of diols such as propanediol-(1,3), butanediol(1,4) and/or hexanediol-(1,6), diethyleneglycol, triethyleneglycol, tetraethyleneglycol with diarylclarbonates, e.g. diphenylcarbonate or phosgene.

Suitable hydroxy polyester amides and polyamides include, for example, the predominantly linear condensates obtained from polyvalent saturated and unsaturated carboxylic acids or their anhydrides and polyvalent saturated and unsaturated amino-alcohols, diamines, polyamines and mixtures thereof. Polyhydroxyl compounds already containing urethane or urea groups may also be used.

Low molecular weight polyols may also be used as part or all of the hydroxyl component, e.g. ethanediol, propanediol-(1,2) and (1,3), butanediol-(1,4) and -(1,3), pentanediols, hexanediols, trimethylol propane, hexanetriols, glycerol and pentaerythritol.

Representatives of the above mentioned polyisocyanate and hydroxyl compounds which may be used in the process according to the invention have been described, for example, in High Polymers, Vol. XVI, "Polyurethanes, Chemistry and Technology" by Saunders-Frisch, Interscience Publishers, New York, London, Volume I, 1962, pages 32–43 and pages 44–54, and Volume II, 1964, pages 506 and 198–199, and in Kunststoff-Handbuch, Volume VII, ViewegHöchtlen, Carl-Hanser Verla, Munich, 1966, e.g. on pages 45 to 71.

3. Components described by way of example in the above literature citations for the preparation of aqueous polyurethane dispersions or solutions, which components contain chemically fixed hydrophilic groups and are preferably monofunctional, most preferably difunctional, in the isocyanate addition reaction, that is to say, for example, diisocyanates, diamines or dihydroxy compounds which contain ionic or potentially ionic groups or diisocyanates or glycols which contain polyethylene oxide units. The preferred hydrophilically modified components include, in particular, aliphpatic diols containing sulphonate groups according to German Auslegeschrift No. 2,446,440, and allowed U.S. patent application Ser. No. 777,206 filed Mar. 14, 1977, incoporated herein by reference; cationic and also anionic internal emulsifiers which are capable of being built into the molecular structure, according to German Patent Application P 26 51 506.0 and copending U.S. Patent Application Ser. No. 849,690, now U.S. Pat. No. 4,237,264, filed Nov. 8, 1977, incorporated herein by reference and the monofunctional polyethers capable of being built into the structure which are also described in the aforesaid Patent Application. When isocyanate prepolymers are prepared according to the known principles employed in the art, the reactants are generally put into the process in proportions corresponding to a ratio of isocyanate groups to isocyanate-reactive hydrogen atoms, preferably those of hydroxyl groups, of from about 1.05 to 10, most preferably from about 1.1 to 3.

The sequence in which the individual reactants are added is to a large extent immaterial. One may either mix the hydroxyl groups and then add the polyisocyanate to the mixture, or the mixture of hydroxyl compounds or the individual hydroxyl compounds in succession may be added to the polyisocyanate component.

Preparation of the isocyanate prepolymers is preferably carried out solvent-free at a temperature of from about 30° to 190° C., most preferably at about 50° to 120° C. Preparation of the prepolymers could, of course, also be carried out in the presence of organic solvents, but it is one of the main advantages of the process according to the invention that such solvents can be dispensed with. Suitable solvents, which could be used in a quantity of up to about 25% by weight, based on the solid content, include, for example, acetone, methylethyl ketone, ethylacetoacetate, dimethyl formamide and cyclohexanone.

The nature and quantitative proportions of the starting materials used for preparation of the isocyanate prepolymers are generally chosen so that the isocyanate prepolymers preferably (a) have an average isocyanate functionality of from about 1.8 to 2.2, most preferably 2, (b) contain from about 0 to 100, most preferably about 0.1 to 100, most particularly about 0.5 to 50, milliequivalents of built-in cationic or anionic groups per 100 g of solid, (c) contain from about 0 to 30, most preferably about 0.5 to 30, most particularly about 1 to 20% by weight of ethylene oxide units built into a side chain or in the end position and/or within the main chain of a polyether segment, this percentage being based on the total weight of the prepolymer, and (d) have an average molecular weight of from about 500 to 10,000, most preferably from about 800 to 4,000.

Among the most prferred isocyanate prepolymers are to be included, as already explained above, those which have either ionic groups of the kind mentioned under (b) immediately above i.e. in particular —COO⁻, —SO₃⁻ or =N⁺=, or non-ionic groups of the kind mentioned under (c) immediately above or both ionic and non-ionic groups of the kind indicated in (b) and (c) immediately above.

However, isocyanate prepolymers which have not been prepared with any of the hydrophilic components mentioned under (3) above and in which the quantity of groups mentioned under (b) and (c) is, therefore, zero, may also be used for the process according to the invention. When such isocyanates are used, which otherwise also have the properties mentioned under (a) and (d) above, it is absolutely essential to use external emulsifiers for carrying out the process according to the invention. Suitable emulsifiers of this kind have been described, for example, by R. Heusch in "Emulsionen", Ullmann, volume 10, pages 449–473, Weinheim 1975, incorporated herein by reference. Both ionic emulsifiers such as alkali metal and ammonium salts of longchain fatty acids or of long-chain aryl(alkyl) sulphonic acids and non-ionic emulsifiers, e.g. ethoxylated alkyl benzenes with an average molecular weight of from about 500 to 10,000 are suitable. The chemical nature of the external emulsifiers is not essential at all. Therefore any emulsifier which is capable to emulsify hydrophobic polyurethanes in water is suitable.

These external emulsifiers are intimately mixed with the isocyanate prepolymers before the process according to the invention is carried out. They are generally used in quantities of from about 1 to 30, preferably about 5 to 20% by weight, based on the weight of the isocyanate prepolymer. When using isocyanate prepolymers which are hydrophilically modified, one may quite well also use such exernal emulsifiers in order to enhance their hydrophilic character although this is generally not necessary.

Organic compounds containing at least two primary and/or secondary amino group are used in addition to the isocyanate prepolymers in the process according to the invention. These compounds are preferably aliphatic or cycloaliphpatic diamines having exclusively primary and/or secondary amino groups. The term "aliphatic or cycloaliphpatic diamine" is used here to refer solely to the nature of the carbon atom attached to the amino groups. Araliphatic diamines are therefore also aliphpatic diamines within the meaning of this invention. Diprimary diamines are particularly preferred, especially those which contain at least one cycloaliphatic ring, in particular one with 6 carbon atoms, regardless of whether the amino group is attached to this cycloaliphatic ring directly or through an alkyl substituent, in particular a methyl substituent. The polyamines to be used in the process of the invention generally have molecular weights from about 60 to 500, preferably from about 100 to 250. Examples of suitable polyamines for the process according to the invention include ethylenediamine, trimethylenediamine, tetramethylenediamine, hexamethylenediamine, propylenediamine-(1,2), the isomeric mixture of 2,2,4- and 2,4,4-trimethylhexamethylenediamine; 1,3- and 1,4-xylylenediamine, bis-(2-aminoethyl)amine and methyl-bis-(3-aminopropyl) amine.

The following, for example, are among the preferred diamines:

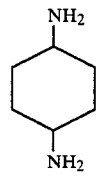

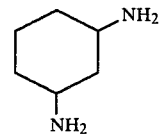

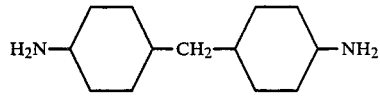

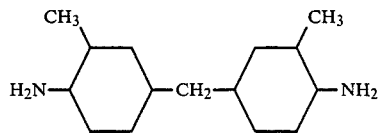

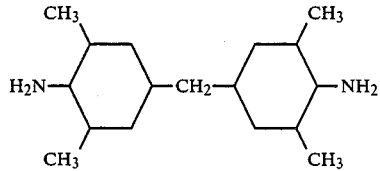

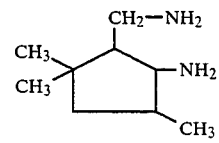

-continued

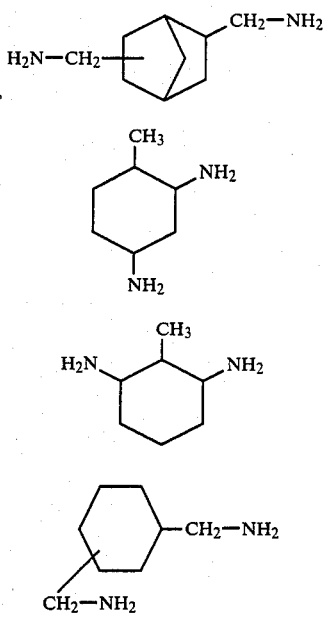

The following is particularly preferred:

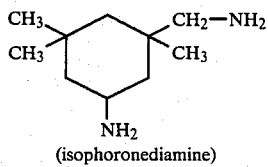

(isophoronediamine)

It is an essential feature of the process according to the invention that the polyamines mentioned as examples are not used as such but in the form of at least partly blocked amines. By "blocked amino groups" are meant, in the context of this invention, especially those primary and secondary amino groups which have been converted into the corresponding ketimine, aldimine or enamine group by reaction an aldehyde or ketone. Such ketimine, aldimine an enamine groups are substantially inert towards isocyanate groups at room temperature in the absence of moisture as described for example in German Offenlegungsschrift No. 2,125,247, U.S. Pat. Nos. 3,420,800 and 3,567,692, all incorporated herein by reference, and German Offenlegungsschrift No. 1,520,139, and react with isocyanate groups only in the presence of water, when they release the corresponding amino group. The polyamines preferably used in the process according to the invention are the at least partly blocked polyamines with aldimine and ketimine groups which are obtained from the preferred polyamines with primary amino groups mentioned above as examples. It is not necessary for all the amino groups to be blocked by reaction with a ketone or aldehyde, provided that at least about 50%, preferably more than about 85%, of the amino groups in the amine component are blocked and that the amines used in the process according to the invention contain, on a statistical average, not more than about 1 mol of free amino groups, preferably not more than about 0.15 mol of free amino groups per mol of polyamine. If, therefore, as is conceivable although not preferred, a triamine with a total of three primary and/or secondary amino groups is used, it is necessary, but also sufficient, if two of the three amino groups are blocked. In the preferred case of using the diamines mentioned as examples, it will be clear from what has been said above that it is necessary, and in the extreme case also sufficient, if one of the two amino groups is blocked. The preparation of at least partially blocked polyamines containing ketimine, aldimine or enamine group is known in the art and has been described, for example, in Houben-Weyl, Methoden der Organischen Chemie, Volume XI/2, pages 73 et seq and in German Auslegeschrift No. 2,125,247. Since the amino groups of the amine component used accoding to the invention need not be blocked quantitatively, the condensation reaction when preparing the partially blocked polyamines also need not be quantitative.

The aldehydes and ketones used for preparing the at least partially blocked polyamines for the process according to the invention may be any organic compounds which have at least one ketone or aldehyde group and are otherwise inert under the reaction conditions, but it is preferred to se aliphatic aldehydes or ketones having from 2 to 18, preferably 2 to 6, carbon atoms, or cycloaliphatic aldehydes or ketones having from 5 to 18, preferably 5 or 6, carbon atoms. Examples of suitable aldehydes and ketones include acetaldehyde, propionaldehyde, butyraldehyde, isobutyraldehyde, acetone, methylethyl ketone, methylisobutyl ketone, diisoproppyl ketone, cyclohexanone and butyraldehyde, isobutyraldehyde, acetone, methylethyl ketone, methylisobutyl ketone, diisoproppyl ketone, cyclohexanone and cyclopentanone. Aromatic aldehydes and ketones such as benzaldehyde, acetophenone or benzophenone are also suitable but less advantageous.

To carry out the process according to the invention, isocyanate prepolymers, which may contain external emulsifiers, are mixed with the above mentioned, at least partly blocked polyamines. The proportion of isocyanate prepolymer to at least partially blocked polyamine is generally chosen so that the equivalent ratio of isocyanate groups of the prepolymer to free + blocked amino groups of the amine component is between about 4:1 and 1:1.5, preferably between about 2:1 and 1:1.25, and most preferably between about 1.2:1 and 1:1.2. The two components are mixed at a temperature in the range of from about −20° to 100° C., preferably at about 20° C. to 60° C. Since not all of the amino groups need be blocked for the process according to the invention, a reaction may occur between the isocyanate groups and the unmasked amino groups when the two components are mixed together, and this may lead to a slight increase in viscosity. It is often therefore advantageous to mix the isocyanate prepolymer with the masked polyamine only shortly before the mixture is dispersed in water.

The next step in the process according to the invention consists of mixingn the mixture with water to prepare the aqueous dispersion and at the same time hydrolyzing the masked polyamines. The quantity of water used for this step is calculated to provide as high as possible a solids content for the dispersion. It is advantageous to prepare dispersions with a solids content of from about 40 to 70% although they can easily be further diluted with water. The water is preferably added all at once, although it may be added gradually, as desired. On the other hand, the mixture of prepolymer and masked isocyanate may also be mixed with water by introducing the said mixture into the aqueous phase. A continuous mixing process may also be employed, in which the prepolymer and masked polyamine are first introduced into a suitable mixing apparatus, followed by water. The water is used at a temperature of from about 0° to 90° C., preferably from about 20° to 60° C.

The dispersions obtained are very finely divided. The particles preferably measure 20–200 nm although they may, of course, be smaller or larger.

The dispersions obtained by the process according to the invention may, of course, be further modified in known manner in a final step. For example, after dispersion has been carried out, another water-soluble polyamine, e.g. hydrazine, may be added if the equivalent ratio of isocyanate groups to free and masked amino groups was chosen so that free isocyanate groups are still present.

If the equivalent ratio of isocyanate groups to free and masked amino groups was originally within the range of from 1:1 to 1:1.5, the polyurethene containing amino end groups may also subsequently be modified in the aqueous phase. The modifying agents used may be, for example, mono orpolyisocyanates, which may or may not be masked, or chemical compounds containing epoxide groups. Such subsequent modification may be carried out to obtain desirable properties; for example, the products may be rendered hydrophobic by reation with stearyl isocyanate.

Whether the process according to the invention results in solutions or in dispersions of the polyurethanes in water depenpds mainly on the molecular weight and hydrophilic character of the dissolved or dispersed particles, which in turn can be adjusted by suitable choice of the nature and proportions of the starting materials, especially those used for the preparation of the isocyanate prepolymers, by the known principles of polyurethane chemistry. If, for example, the isocyanate prepolymer has an average isocyanate functionality of slightly less than two, the polyaddition reaction stops before the molecular weights are too high.

The polyurethanes prepared in aqueous dispersion or solution by the process according to the invention are equal in quality to the known polyurethanes prepared in organic solvents. Films produced from them have excellent mechanical strength and resistance to hydrolysis and can be used in various fields of application. One particularly preferred application of the dispersions or solutions according to the invention is the coating of flexible substrates. The dispersions are also particularly suitable for textile finishes, glass fiber sizes and adhesives.

EXAMPLES

Example 1

Starting materials;

| | |
|---|---|
| 1237.5 g | polyester of adipic acid and butanediol (molecular weight 2250) |
| 191.3 g | propoxylated adduct of 2-butenediol-1,4 and NaHSO$_3$ (molecular weight 425) |
| 488.4 g | isophoronediisocyanate |
| 300.6 g | ketimine of isophorone diamine and methylisobutyl ketone (98% of amino groups blocked) |
| 3,000 g | deionized water |

Method:

The isophorone diisocyanate is added at 70° C. to the mixture of polyester and bisulphite adduct which has been dehydrated under vacuum at 120° C. The mixture is stirred at 100° C. until the isocyanate content is 5.3%.

The prepolymer is then cooled to 60° C.; the bis-ketimine is added; the mixture is vigorously stirred, and water is then added.

A dispersion having a solidls content of 40% and a Ford cup viscosity (4 mm nozzle) of 14 seconds is obtained. The dispersion shows a Tyndall effect in transmitted light.

The dispersion dries to form a clear, elastic film and is suitable for coating textiles.

Example 2

A prepolymer is prepared as in Example 1. After it has cooled to 60° C., 250.2 g of a ketimine of isophorone diamine and methylethyl ketone (87% of the amino groups blocked) are stirred in, and the mixture is dispersed as described in Example 1. The resulting dispersion is a highly fluid liquid which shows a Tyndall effect.

Example 3

A prepolymer is prepared as in Example 1. When it has cooled t 60° C., 225 g of a ketimine of isphorone diamine and acetone (80% of amino groups blocked) are stirred in and the mixture is dispersed as described in Example 1. The resulting dispersion is a thin liquid and shows a Tyndall effect.

Example 4

A prepolymer is prepared as in Example 1. When it has cooled to 60° C., 250.2 g of an aldimine of isphorone diamine and isobutyraldehyde (99% of the amino groups blocked) are stirred in and the mixture is dispersed as described in Examle 1. The resulting dispersion is a thin liquid and shows a Tyndall effect.

Example 5

A prepolymer is prepared as in Example 1. When it has cooled to 60° C., 297 g of a ketimine of isophorone diamine and cyclohexanone (99% of amino groups blocked) are stirred in and the mixture is dispersed as described in Example 1. The resulting dispersion is a thin liquid and shows a Tyndall effect.

Example 6

A prepolymer is prepared as in Example 1. When it has cooled to 50° C., 25.3 of a condensation product of diethylene triamine and methylethyl ketone represented by the following formula:

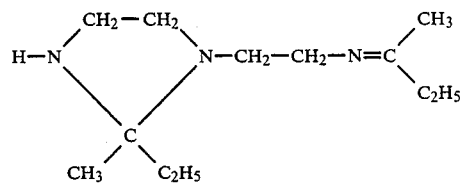

was added. The temperature rose by 10° C. on addition of this compound. The quantity of free NH groups put into the process corresponds to 5% conversion of the available isocyanate groups. 200.1g of a ketimine of isophorone diamine (90% of amino groups blocked) and methylethyl ketone are then stirred in and the mixture is dispersed as described in Example 1. The resulting dispersion is a thin liquid and shows a Tyndall effect.

Example 7

Starting materials:

| | |
|---|---|
| 600 g | polyester of phthalic acid and ethane diol (molecular weight 2000) |
| 525 g | polyester of phthalic acid, adipic acid and ethane diol (molecular weight 1750) |
| 170 g | propoxylated adduct of 2-butenediol-(1,4) and sodium bisulphite (mol. wt. 425) |
| 285.6 g | hexamethylene-1,6-diisocyanate |
| 112 g | bis-ketimine of hexamethylene-1,6-diamine an methylisobutyl ketone (100% of amino groups blocked) |
| 3700 g | deionized water |

Method:

Hexamethylene-1,6-diisocyanate is added at 70° C. to the mixture of the two polyesters and the bisulphite adduct, which mixture has been dehydrated under vacuum at 120° C., and the whole mixture is then stirred at 100° C. until it has an isocyanate content of 4.1%. The prepolymer is then cooled to 80° C., the bis-ketimine is added, the mixture is vigorously stirred and the water is added.

A dispersion with a solids content of 30% and a Ford cup viscosity (4mm nozzle) of 15 seconds is obtained. It shows a Tyndall effect in transmitted light. It dries to form clear, colorless, elastic films and is suitable for coating paper and leather.

Example 8

Starting materials:

| | |
|---|---|
| 300 g | polyester of phthalic acid and ethanediol (mol. wt. 2000) |
| 612.5 g | polyester of phthalic acid, adipic acid and ethanediol (mol. wt. 1750) |
| 13.4 g | trimethylol propane |
| 148.8 g | propoxylated adduct of 2-butenediol-(1,4) and NaHSO$_3$ (mol. wt. 425) |
| 285.6 g | hexamethylene-1,6-diisocyanate |
| 78.4 g | ketimine of hexamethylene-1,6-diamine and acetone (95% of amino groups blocked) |
| 3,300 g | deionized water |

Method:

Hexamethylene-1,6-diisocyanate is added at 70° C. to the mixture of the two polyesters, trimethlol propane and the bisulphite adduct, which mixture has been dehydrated under vacuum at 120° C., and the whole mixture is stirred at 100° C. until it has an isocyanate content of 4.3%. The prepolymer is then cooled to 80° C., the bis-ketimine is added, the mixture is vigorously stirred and water is added.

A dispersion having a solids content of 30% and a Ford cup viscosity (4mm nozzle) of 15 seconds is obtained. It shows a Tyndall effect in transmitted light. It is suitable for use as binder for dressing leather and dries to form clear, colorless, elastic films.

Example 9

Starting materials:

| | |
|---|---|
| 600 g | polyester of phthalic acid and ethanediol (mol. wt. 2000) |
| 700 g | polyester of phthalic acid, adipic acid and ethanediol (mol. wt. 1750) |
| 127.8 g | propoxylates adduct of 2-butenediol-(1,4) and sodium bisulphite (mol. wt. 425) |
| 285.6 g | hexamethylene-1,6-diisocyanate |
| 149.6 g | ketimine of 4,4'-diaminocyclohexylamine and methyl-isobuytl ketone (98% of amino groups blocked) |
| 4100 g | deionized water |

Method:

Hexamethylene-1,6-diisocyanate is added at 70° C. to the mixture of the two polyesters and bisulphite adduct, which mixture has been dehydrated under vacuum at 120° C., and the whole mixture is stirred at 100° C. until it has an isocyanate content of 3.4%. The prepolymer is cooled to 80° C., the ketimine is added, the mixture is vigorously stirred, and the water is added. A dispersion having a solids content of 30% and a Ford cup viscosity (4mm nozzle) of 13 seconds is obtained. The dispersion shows a Tyndall effect in transmitted light.

Example 10

Starting materials:

| | |
|---|---|
| 1,000 g | Polyester of adipic acid, ethylene glycol, butanediol-(1,4) and diethylene glycol (mol. wt. 2000) |
| 1,100 g | Adduct of equivalent parts of (i) a polyether of 83% ethylene oxide and 17% propylene oxide, started on n-butanol (ii) hexamethylene-1,6-diisocyanate (iii) diethanolamine (mol. wt. 2,200) |
| 369.2 g | hexamethylene-1,6-diisocyanate |
| 250.2 g | ketimine of isophorone diamine and methyl-ethyl ketone (90% of amino groups blocked) |
| 6,000 g | deionized water |

Method:

Hexamethylene-1,6-diamine is added at 70° C. to the mixture of polyester and polyetherdiol which has been dehydrated under vacuum at 120° C., and the whole mixture is stirred at 100° C. until it has an isocyanate content of 4.1%. The prepolymer is cooled to 40° C.; the bis-ketimine is added; the mixture is vigorously stirred; and the water is added.

A dispersion having a solids content of 30% and a Ford cup viscosity (4 mm nozzle) of 17 seconds is obtained. It shows a pronounced Tyndall effect in transmitted light.

Example 11

Starting materials:

| | |
|---|---|
| 1,867.5 g | polyester of adipic acid and butanediol (mol. wt. 2,250) |
| 85.8 g | polyether of 15% propylene oxide and 85% ethylene oxide, started on n-butanol (mol. wt. 2145) |
| 63.9 g | propoxylated adduct of 2-butenediol-(1,4) and sodium bisulphite (mol. wt. 425) |
| 488.4 g | isophorone diisocyanate |
| 300.6 g | ketimine of isophorone diamine and methyl-isobutyl ketone (98% of amino groups blocked) |
| 1780 g | deionized water |

Method:

Isophorone disocyanate is added at 70° C. to the mixture of polyester, polyether and bisulphite adduct which has been dehydrated at 120° C. under vacuum, and the mixture is stirred at 100° C. until it has an isocyanate content of 4.0%. The prepolymer is then cooled to 60° C., the bis-ketimine is added, the mixture is vigorously stirred, and the water is added.

A dispersion having a solid content ofo 60% and a Ford cup viscosity (4mm nozzle) of 85 seconds is obtained. The dispersion shows a Tyndall effect in transmitted light. The dispersion is suitable for coating textiles. It dries to form clear, colorless, elastic films which have the following properties:

| Tensile strength: | 494 kg. wt./cm$^2$ |
|---|---|
| Elongation at break: | 580% |

Example 12 Starting materials:

| 1,125 g | polyester of adipic acid and butanediol (mol. wt. 2250) |
|---|---|
| 181.5 g | polypropylene oxide polyether started on bisphenol (mol. wt. 550) |
| 85.8 g | polyether of 15% propylene oxide and 85% ethylene oxide started on n-butanol (mol wt. 2,145) |
| 63.9 g | propoxylated adduct of 2-butenediol-(1,4) and sodium bisulphite (mol. wt. 425) |
| 133.2 g | isophorone diisocyanate |
| 302.4 g | hexamethylene-1,6-diisocyanate |
| 222.4 g | ketimine of isophorone diamine and methyl-ethyl ketone (90% of amino groups blocked) |
| 3,000 g | deionized water |
| 15 g | hydrazine hydrate |

Method:

A mixture of isphorone diisocyanatet and hexamethylene-1, 6-diisocyanate is added at 70° C. to the mixture of the polyester, the two polyethers and the bisulphite adduct which has been dehydrated under vacuum at 120° C. The whole mixture is then stirred at 100° C. until it has an isocyanate content of 6.2%. The prepolymer is cooled to 60° C., the bis-ketimine is added, the mixture is vigorously stirred, and the water is added. Hydrazine hydrate is added after 5 minutes, and stirring continued for 2 hours. A dispersion having solids contetnt of 40% and a Ford cup viscosity (4mm nozzle) of 13 seconds is obtatined. The dispersion shows a Tyndall effect in transmitted light. The dispersion is suitable for coating textiles. It dries to form a clear, colorless, elastic film which is distinquished by its resistance to hydrolysis and to UV radiation.

|  | Initial value | after 14 days' hydrolysis test | After 400 hours Xenotest* |
|---|---|---|---|
| Tensile strength | 534 kp/cm$^2$ | 432 kp/cm$^2$ | 430 kp/cm$^2$ |
| Elongation at break | 670% | 550% | 530% |

*In the "Xenotest" the sample is submitted to the irradiation of a UV-light radiation of a gas discharge lamp filled with xenon gas.

Example 13

Starting materials:

| 675 g | Polyester of adipic acid and butanediol (mol. wt. 2550) |
|---|---|
| 165 g | polypropylene oxide polyether, started on bisphenol A (mol. wt. 550) |
| 488.4 g | isophorone diisocyanate |
| 107.2 g | dimethylol propionic acid |
| 70.7 g | triethylamine |
| 139 g | ketimine of isoporone diamine and methyl-ethyl ketone (90% of amino groups blocked) |
| 3600 g | deionized water |

Method:

Isophorone diisocyanate is added at 70° C. to the mixture of polyester and polyether which has been dehydrated under vacuum at 120° C., the whole mixture is stirred at 100° C. until it has an isocyanate content of 10.1%. It is then cooled to 70° C., dimethylolpropionic acid is added and the prepolymer reaction is allowed to continue at the same temperature. When the theoretical isocyanate content of 4.7 % has been reached, triethylamine and bis-ketimine are added, one after the other and, while the mixture is vigorously stirred, the water is added. A dispersion having a solids content of 30% and a Ford cup viscosity of (4 mm nozzle) 14 seconds is obtained. The dispersion shows a Tyndall effect in transmitted light.

Example 14

Starting materials:

| 945 g | Polyester of adipic acid and butanediol (mol. wt. 2250) |
|---|---|
| 137.5 g | polypropylene oxide polyether, started on bisphenol A (mol. wt. 550) |
| 128.7 g | polyether of 15% propylene oxide and 85% ethylene oxide started on n-butanol (mol. wt. 2145) |
| 488.4 g | isophorone diisocyanate |
| 80.4 g | dimethylol propionic acid |
| 50 g | triethylamine |
| 200.4 g | ketimine of isophorone diamine and methyl-isobutyl ketone (98% of amino groups blocked) |
| 4300 g | deionized water |

Method:

Isophorone diisocyanate is added at 70° C. to the mixture of the polyester and the two polyethers which has been dehydrated at 120° C.; dimethylol propionic acid is added; and the prepolymer reaction is left to continue at the same temperature. When the theoretical isocyanate content of 4.2% has been reached, triethylamine and the bis-ketimine are added, one after the other, to the vigorously stirred mixture, and the water is added. A dispersion having a solids contentn of 30% and a Ford cup viscosity (4mm nozzle) of 12 seconds is obtained. The dispersion shows a Tyndall effect in transmitted light.

Example 15

Starting materials:

| 1,012.5 g | Polyester of adipic acid and butanediol (mol. wt. 2250) |
|---|---|
| 137.5 g | polypropylene oxide polyether started on bisphenol A (mol. wt. 550) |
| 488.4 g | isophorone diisocyanate |
| 71.4 g | N—methyl-diethanolamine |
| 75.6 g | dimethyl sulphate |
| 166.8 g | ketimine of isophorone diamine and methyl-ethyl ketone (90% of amino groups blocked) |
| 4200 g | deionized water |

Method:

Isophorone diisocyanate is added at 60° C. to the mixture of polyester and polyether which has been dehydrated under vacuum at 120° C., and N-methyl-diethanolamine is then added dropwise. The mixture is stirred at 100° C. until it has isocyanate content of 4.4%. The prepolymer is cooled to 60° C., dimethyl sulphate is added, and the mixture is stirred at the same temperature for a further 30 minutes, until the quaternization reaction has been completed. The bis-ketimine is then added; and the water is added under rigorous stirring.

A dispersion having a solids content of 30% and a Ford cup viscosity (4mm nozzle) of 13˙ seconds is ob-

Example 16

Starting materials:

| | |
|---|---|
| 945 g | Polyester of adipic acid and butanediol (mol. wt. 2250) |
| 192.5 g | polypropylene oxide polyether started on bisphenol A (mol. wt. 550) |
| 128.7 g | polyether of 15% propylene oxide and 85% ethylene oxide started on n-butanol (mol. wt. 2145) |
| 488.4 g | isophorone diisocyanate |
| 47.6 g | N—methyl-diethanolamine |
| 50.4 g | dimethyl sulphate |
| 194.6 g | ketimine of isophorone diamine and methyl-ethyl ketone (90% of amino groups blocked) |
| 4500 g | deionized water |

Method:

Isophorone diisocyanate is added at 60° C. to the mixture of polyester and the two polyethers which has been dehydrated under vacuum at 120° C., and N-methyl-diethanolamine is then added dropwise. The whole mixture is then stirred at 100° C. until it has an isocyanate content of 4.7%. The prepolymer is cooled to 60° C., dimethyl sulphate is added, and the mixture is stirred at the same temperatue for a further 30 minutes, until the quaternization reaction has been completed. The bis-ketimine is then added, and water is added to the thoroughly stirred mixture. A dispersion having a solids content of 30% and a Ford cup viscosity (4mm nozzle) of 16 seconds is obtained. The dispersion shows a Tyndall effect in transmitted light.

Example 17

Starting materials:

| | |
|---|---|
| 1560 g | Polyester of adipic acid, ethylene glycol, butane diol-(1,4) and diethylene glycol (mol. wt. 2000) |
| 85.8 g | polyether of 15% propylene oxide and 85% ethylene oxide, started on n-butanol (mol. wt. 2145) |
| 85.2 g | propoxylated adduct of 2-butenediol-(1,4) and NaHSO$_3$ (mol. wt. 425) |
| 369.6 g | hexamethylene-1,6-diisocyanate |
| 250.2 g | ketimine of isophorone diamine and methyl-ethyl ketone (90% of amino group blocked) |
| 5050 g | deionized water |

Method:

Hexamethylene-1,6-diisocyanate is added at 70° C. to the mixture of polyester, polyether and bisulphite adduct which has been dehydrated at 120° C. under vacuum, and the whole mixture is stirred at 100° C. until it has an isocyanate content of 4.8%. The prepolymer is then cooled to 40° C. and the bis-ketimine is added. The homogeneous mixture is then poured with vigorous stirring into the deionized water.

A dispersion having a solids content of 30% and a Ford cup viscosity (4mm nozzle) of 14 seconds is obtained. The dispersion shows a Tyndall effect in transmitted light.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of aqueous dispersions of polyurethane-polyureas by the reaction of (1) prepolymers which have at least two free isocyanate groups and contatin chemically fixed hydrophilic groups or external emulsifiers which are not chemically fixed with (2) organic compounds containing at least two groups selected from the group consisting of primary and secondary amino groups characterized in that the isocyanate-contatining prepolymer component (1), which is hydrophilically modified or contains an external emulsifier, is mixed, in the absence of water, with the organic compound component (2) which contains at least two groups selected from the group consisting of primary and secondary amino groups wherein at most one amino group is a free primary or secondary amino group and at least one amino group is a blocked amino group which is substantially inert toward isocyanate groups at room temperature in the absence of moisture and which releases a free primary or secondary amino group in the presence of water, and the mixture obtained is subsequently mixed with an amount of water sufficient to provide aqueous dispersions with a solids content of less than about 70% by weight.

2. The process according to claim 1, characterized in that the nature and proportions of the reactants are chosen so that from about 0.25 to 1.5 free plus blocked amino groups which are reactive with isocyanate groups are present for each isocyanate group of the isocyanate prepolymer.

3. A process for the production of an aqueous dispersion of a polyurethane polyurea comprising mixing in the absence of water
 (a) a hydrophilic NCO-prepolymer having
  (i) an average isocyanate functionality of from about 1.8 to 2.2,
  (ii) an average molecular weight of from about 500 to 10,000, and
  (iii) its hydrophilic properties contributed by dispersing centers selected from the group consisting of chemically incorporated cationic or anionic groups present in said NCO-prepolymer in from about 0.1 to 100 milliequivalents per 100 g of NCO-prepolymer, chemically incorporated ethylene oxide units present in said NCO-prepolymer in from about 0.5 to 30% by weight, based on the weight of the NCO polymer, and external emulsifiers present in about 1 to 30% by weight, based on the weight of the NCO-prepolymer, with
 (b) a polyamine having
  (i) at least two amino groups selected from the group consisting of primary amino groups and secondary amino groups,
  (ii) at most one free primary of secondary amino group,
  (iii) at least one blocked amino group which is substantially inert toard isocyanate groups at room temperature in the absence of moisture and which releases a free primary or secondary amino group in the presence of water, and
  (iv) a molecular weight of from about 60 to 500, and subsequently mixing the mixture of components (a) and (b) with an amount of water sufficient to provide an aqueous dispersion with a solids content of less than about 70% by weight.

4. The process of claim 3 wherein the blocked amino groups are blocked with compounds selected from the group consisting of aldehydes and ketones.

5. The process of claim 3 wherein the equivalent ratio of isocyanate groups of the NCO-prepolymer to free plus blocked amino groups of the polyamine is between about 4:1 and 1:1.5.

6. An aqueous polyurethane polyurea dispersion produced by the process of claim 3.

7. The aqueous polyurethane polyurea dispersion of claim 6 wherein the particle size is from about 20-200 mm.

8. The aqueous polyurethane polyurea dispersion of claim 6 wherein the solids content is from about 40 to 70% by weight.

9. An aqeuous polyurethane polyurea dispersion produced by the process of claim 1.

* * * * *